United States Patent
Kwon et al.

(10) Patent No.: US 10,529,060 B2
(45) Date of Patent: Jan. 7, 2020

(54) TIME-OF-FLIGHT MEASURING APPARATUS AND IMAGE PROCESSING METHOD FOR REDUCING BLUR OF DEPTH IMAGE THEREIN

(71) Applicant: SAMSUNG ELECTRONICS CO., LTD., Suwon-si (KR)

(72) Inventors: Namseop Kwon, Suwon-si (KR); Byunghoon Na, Suwon-si (KR); Yonghwa Park, Yongin-si (KR); Jangwoo You, Seoul (KR); Heesun Yoon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 15/690,972

(22) Filed: Aug. 30, 2017

(65) Prior Publication Data

US 2018/0068424 A1    Mar. 8, 2018

(30) Foreign Application Priority Data

Sep. 7, 2016  (KR) .................. 10-2016-0115259

(51) Int. Cl.
*G06T 5/00* (2006.01)
*G01S 17/89* (2006.01)
*G01S 17/08* (2006.01)
*G01S 7/491* (2006.01)
*H04N 5/33* (2006.01)
(Continued)

(52) U.S. Cl.
CPC .............. *G06T 5/003* (2013.01); *G01S 7/493* (2013.01); *G01S 7/497* (2013.01); *G01S 7/4915* (2013.01); *G01S 17/08* (2013.01); *G01S 17/89* (2013.01); *G06T 5/20* (2013.01); *H04N 5/33* (2013.01); *G06T 2207/10028* (2013.01)

(58) Field of Classification Search
CPC ........ G01S 17/08; G01S 17/89; G01S 7/4915; G01S 7/493; G01S 7/497; G06T 2207/10028; G06T 5/003; G06T 5/20; H04N 5/33
See application file for complete search history.

(56) References Cited

U.S. PATENT DOCUMENTS 7,796,239 B2    9/2010    Sawachi
9,295,431 B2    3/2016    Hong et al.
(Continued)

FOREIGN PATENT DOCUMENTS

EP    2 073 035 A1    6/2009
JP    2008-241259 A    10/2008
KR    10-2016-0057167 A    5/2016

OTHER PUBLICATIONS

Communication dated Sep. 29, 2017 by the European Patent Office in counterpart European Patent Application No. 17157312.4.

*Primary Examiner* — Kenny A Cese
(74) *Attorney, Agent, or Firm* — Sughrue Mion, PLLC

(57) ABSTRACT

A time of flight (ToF) measuring apparatus and an image processing method for reducing blur of a depth image in the ToF measuring apparatus are provided. The apparatus senses infrared (IR) light reflected by a subject and incident via an optical shutter, models a spread characteristic of the IR light based on an intensity distribution of the sensed IR light, and acquires a sharpening filter by using the modeled spread characteristic.

18 Claims, 17 Drawing Sheets

(51) Int. Cl.
*G06T 5/20* (2006.01)
*G01S 7/493* (2006.01)
*G01S 7/497* (2006.01)

(56) References Cited

U.S. PATENT DOCUMENTS

| | | |
|---|---|---|
| 2010/0202666 A1 | 8/2010 | Ren et al. |
| 2012/0033045 A1 | 2/2012 | Schweizer et al. |
| 2012/0050580 A1 | 3/2012 | Iwasaki |
| 2013/0242111 A1 | 9/2013 | Lee et al. |
| 2015/0156479 A1* | 6/2015 | You ............... H04N 5/2254 348/47 |
| 2016/0142701 A1 | 5/2016 | Jeon et al. |
| 2016/0327779 A1* | 11/2016 | Hillman ............ G02B 21/367 |

* cited by examiner

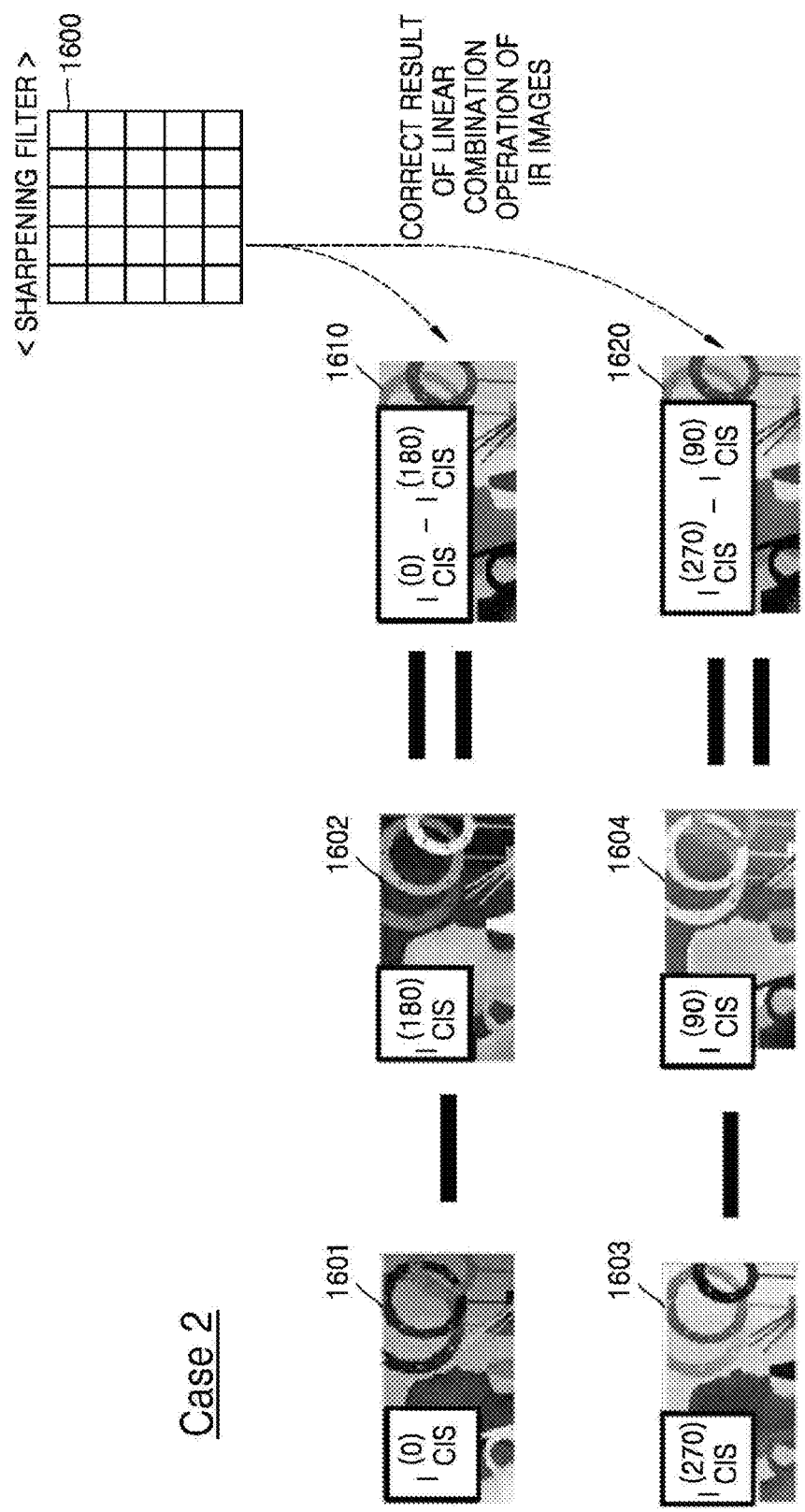

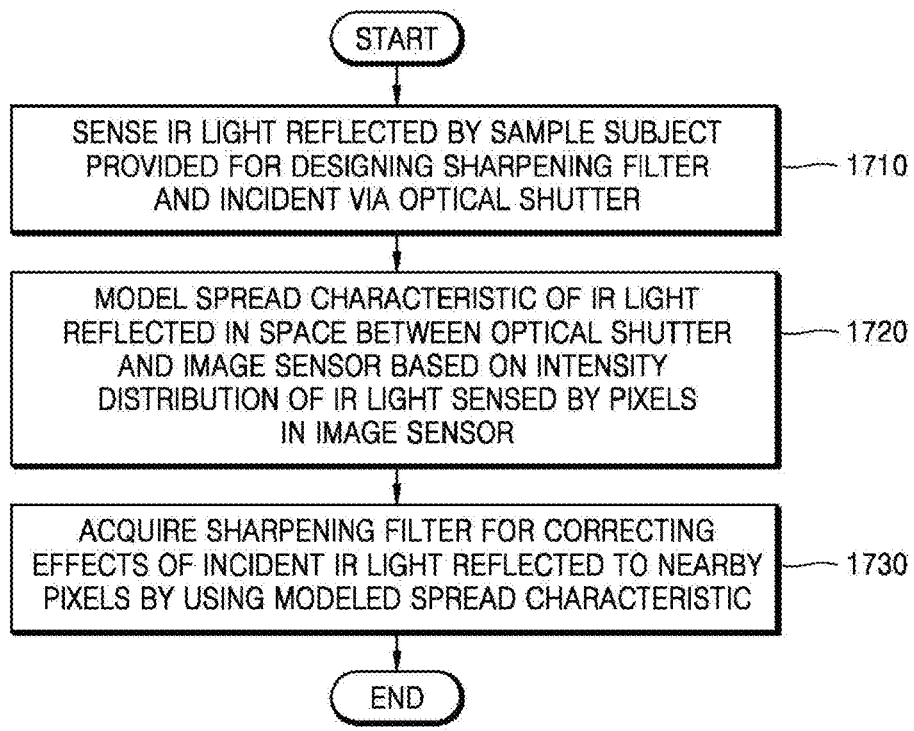

ABSTRACT# TIME-OF-FLIGHT MEASURING APPARATUS AND IMAGE PROCESSING METHOD FOR REDUCING BLUR OF DEPTH IMAGE THEREIN

CROSS-REFERENCE TO RELATED APPLICATION

This application claims priority from Korean Patent Application No. 10-2016-0115259, filed on Sep. 7, 2016, in the Korean Intellectual Property Office, the disclosure of which is incorporated herein by reference in its entirety.

BACKGROUND

1. Field

Exemplary embodiments relate to a time of flight (ToF) measuring apparatus and an image processing method for reducing blur of a depth image in the ToF measuring apparatus.

2. Description of the Related Art

Research for a three dimensional (3D) camera, a motion capture sensor, a laser radar (LADAR), etc. which may acquire information on a distance to a subject has been increasing recently. In particular, with the development of 3D display devices which may display a depth image and an increase in demand for such 3D display devices, the importance of 3D content is on the rise. Accordingly, various depth image capturing apparatuses with which general users may create 3D content are being researched.

Depth information of distances between surfaces of a subject and a depth image capturing apparatus may be obtained by means of a stereoscopic vision method that involves the use of two cameras or triangulation using structured light and a camera. Also, a depth image capturing apparatus employing a ToF method is being used.

SUMMARY

Provided are a time of flight (ToF) measuring apparatus and an image processing method for reducing blur of a depth image in the ToF measuring apparatus.

Additional aspects will be set forth in part in the description which follows and, in part, will be apparent from the description, or may be learned by practice of the presented exemplary embodiments.

According to an aspect of an exemplary embodiment, an image processing method for reducing blur of a depth image includes: sensing, by an image sensor, infrared (IR) light reflected by a sample subject and incident via an optical shutter; modeling a spread characteristic of the IR light reflected in a space between the optical shutter and the image sensor based on an intensity distribution of the IR light sensed by pixels in the image sensor; and acquiring a sharpening filter which is configured for correcting effects of the incident IR light reflected toward nearby pixels by using the modeled spread characteristic.

According to an aspect of another exemplary embodiment, a non-transitory computer-readable recording medium storing a program for causing a computer to execute the above method is provided.

According to an aspect of another exemplary embodiment, a ToF measuring apparatus comprises: an optical shutter; an image sensor configured to sense infrared (IR) light reflected by a sample subject and incident via the optical shutter; and a processor configured to model a spread characteristic of the IR light reflected in a space between the optical shutter and the image sensor based on an intensity distribution of the IR light sensed by pixels in the image sensor, and to acquire a sharpening filter which is configured for correcting effects of the incident IR light reflected toward nearby pixels by using the modeled spread characteristic.

BRIEF DESCRIPTION OF THE DRAWINGS

These and/or other aspects will become apparent and more readily appreciated from the following description of exemplary embodiments, taken in conjunction with the accompanying drawings in which:

FIG. 16 is a diagram illustrating a case of correcting a result of a linear combination operation of IR images with a sharpening filter (case 2), according to an exemplary embodiment; and FIG. 17 is a flowchart of an image processing method for reducing blur of a depth image, according to an exemplary embodiment.

DETAILED DESCRIPTION

As terminology used in this specification, general terms currently in wide use are selected wherever possible in consideration of functions in the present disclosure, but may vary according to intentions of those of ordinary skill in the art, precedent cases, the advent of new technology, and so on. In particular, some terms may be arbitrarily selected by the applicant, and in such cases, the detailed meanings of the terms will be stated in the corresponding description. Therefore, the terms used in this specification should be defined based on the meanings of the terms together with the description throughout the specification rather than simple definitions thereof.

In descriptions of exemplary embodiments, when a portion is referred to as being "connected" to another portion, it may be directly connected to the other portion, or may be electrically connected to the other portion with another element interposed therebetween. Also, unless otherwise described, when a portion includes an element, another element may also be included, rather than the presence of other elements being excluded. Also, terms such as "portion," etc. used herein indicate a unit for processing at least one function or operation, and the unit may be embodied as hardware or software or may be embodied by a combination of hardware and software.

The terms "include," "including," etc. as used with respect to exemplary embodiments are not to be interpreted as necessarily including all various elements or operations set forth in this specification, and it should be understood that some elements or some operations among them may not be included or additional elements or operations may be further included. Expressions such as "at least one of," when preceding a list of elements, modify the entire list of elements and do not modify the individual elements of the list.

The following descriptions of exemplary embodiments is not to be interpreted as limiting the scope of the present disclosure, and content that may be easily inferred by those of ordinary skill in the art should be interpreted as being within the scope of the exemplary embodiments. Hereinafter, exemplary embodiments will be described in detail with reference to the appended drawings only for exemplification.

Figure 1:
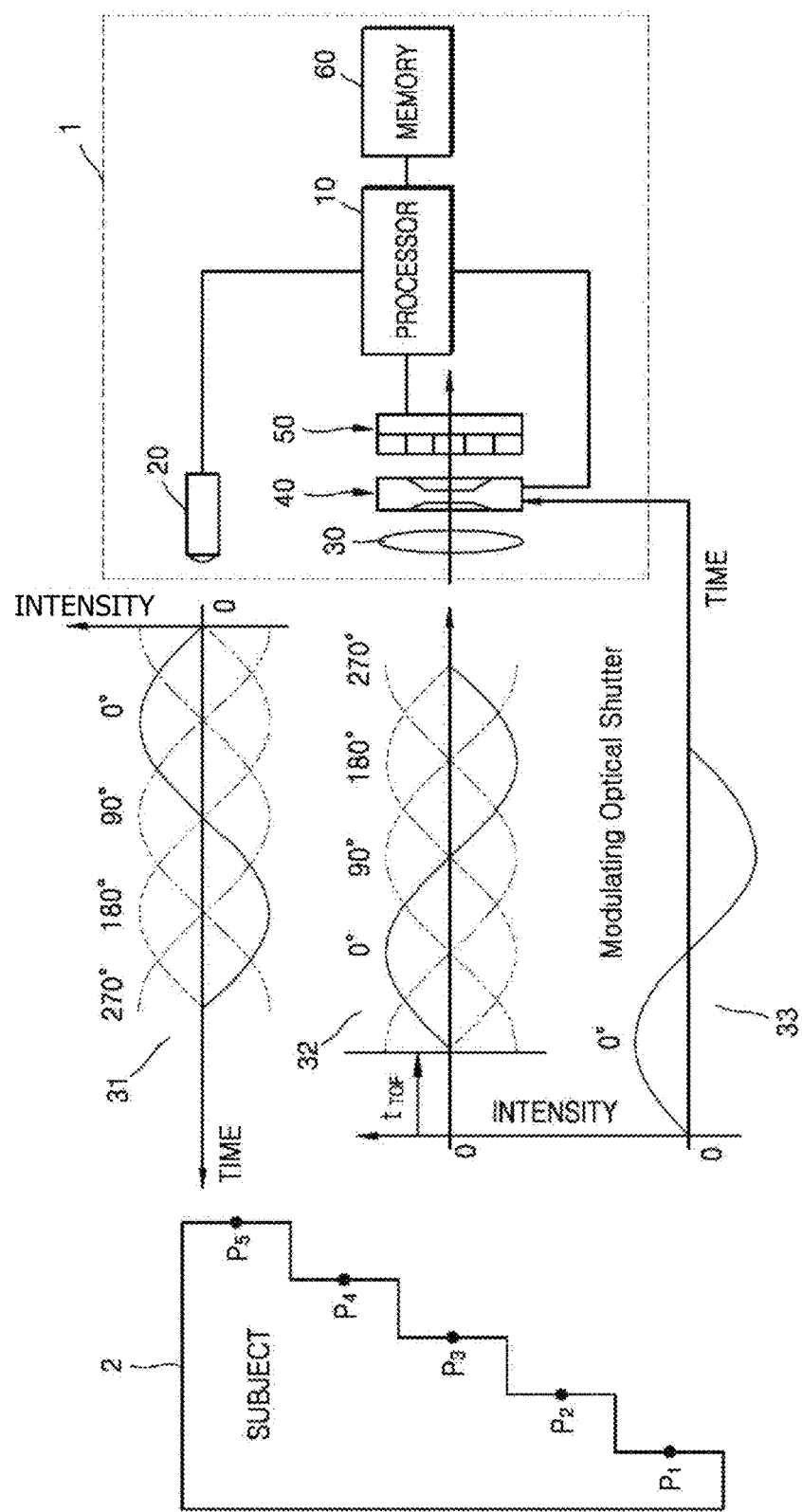
FIG. 1 is a diagram showing a hardware configuration of a time of flight (ToF) measuring apparatus, according to an exemplary embodiment.

FIG. 1 is a diagram showing a hardware configuration of a time of flight (ToF) measuring apparatus, according to an exemplary embodiment. In a ToF measuring apparatus 1 shown in FIG. 1, only elements related to the exemplary embodiment are shown. Therefore, those of ordinary skill in the art may understand that general-purpose elements other than the elements shown in FIG. 1 may be further included.

Referring to FIG. 1, the ToF measuring apparatus 1 may include a light source 20 which emits light toward a subject 2, a lens 30 which receives light reflected by the subject 2, an optical shutter 40, and an image sensor 50. The optical shutter 40 may be placed on a path along which the light emitted from the light source 20 and the light reflected by the subject 2 propagate, and may modulate a waveform of the reflected light by changing a transmittance of the reflected light. Also, the ToF measuring apparatus 1 may include a processor 10 that controls the light source 20, the optical shutter 40, and the image sensor 50, and that generates a depth image by calculating a phase of measured light reflected by the subject 2 and computing depth information and distance information of the subject 2, and a memory 60 that stores a result processed by the processor 10.

The light source 20 may be implemented as a light-emitting diode (LED) or a laser diode (LD). The light source 20 may emit infrared (IR) or near-IR light toward the subject 2. Kinds of light that may be emitted by the light source 20 are not limited thereto, but a case in which the kind of light is IR light will be described as an example for convenience of description with respect to exemplary embodiments disclosed herein.

The light source 20 may emit rays of light of different phases in sequence. For example, the light source 20 may emit rays of light having a phase of 0 degrees, a phase of 90 degrees, a phase of 180 degrees, and a phase of 270 degrees toward the subject 2. In this aspect, in the present exemplary embodiment, four phases are used as an example for convenience, but kinds and/or numbers of phases are not limited thereto.

Emitted light of each phase is reflected by a surface of the subject 2. Reflected rays of light of different phases are incident on the optical shutter 40 via the lens 30. The lens 30 focuses the light reflected by the subject 2. The reflected light focused by the lens 30 is incident on the optical shutter 40 and the image sensor 50.

A travel time of light emitted by the light source 20 and reflected by the subject 2 may be determined based on a distance between the light source 20 and the subject 2. For example, rays of light reflected by a plurality of points P1, P2, P3, P4, and P5 may have different respective travel times due to corresponding differences in travel distances thereof. Therefore, by calculating a respective travel time that corresponds to a difference between a point in time at which the light source 20 emits light and a point in time at which the image sensor 50 senses the light, it is possible to calculate a distance between the subject 2 and the ToF measuring apparatus 1. The ToF measuring apparatus 1 may calculate depths of the subject 2 and surroundings of the subject 2 by using the principle of ToF, and thereby generate a depth image of a scene that includes the subject 2 and the surroundings of the subject 2.

Referring to a graph 31 as illustrated in FIG. 1, rays of light emitted from the light source 20 are emitted toward the subject 2 at different phases according to time. As exemplified above, the light source 20 may emit rays of light having a phase of 0 degrees, a phase of 90 degrees, a phase of 180 degrees, and a phase of 270 degrees toward the subject 2. Referring to a graph 32 of FIG. 1, an emitted ray of light of each phase is incident on the optical shutter 40 and the image sensor 50 of the ToF measuring apparatus 1 as a corresponding reflected ray of light of each phase. At this time, opening and closing timings of the optical shutter are adjusted according to the change of time as shown in a graph 33 as illustrated in FIG. 1, such that the optical shutter 40 may control the incidence of the reflected light on the image sensor 50.

The image sensor 50 may be a complementary metal oxide semiconductor (CMOS) image sensor (CIS) or a charge coupled device (CCD), but the kind of image sensor is not limited thereto. The image sensor 50 may be implemented as, for example, a pixel array having sensing devices of n×n (where n is a natural number) pixels. Although a square pixel array is assumed for convenience of description in the present exemplary embodiment, the number of rows or columns of the pixel array in the image sensor is not limited thereto and may vary.

The processor 10 generates a depth image by using optical signals of different phases sensed by the image sensor 50. In detail, the processor 10 generates an IR image that corresponds to each of the phases based on sensed intensities of IR rays, calculates ToFs by using the IR images of each of the phases, and generates a depth image with depth values based on the calculated ToFs. In this aspect, the processor 10 controls functions and operations of the light source 20, the optical shutter 40, the image sensor 50, and the memory 60 in the ToF measuring apparatus 1.

The memory 60 stores a result processed in the ToF measuring apparatus 1, for example, data about the IR light signals, the generated IR images, the ToF calculation results, the depth values, the depth image, etc., and provides the stored data to each element in the ToF measuring apparatus 1 when necessary.

As shown in FIG. 1, the optical shutter 40 is provided in the ToF measuring apparatus 1. In the ToF measuring apparatus 1 using the optical shutter 40, the optical shutter 40 is disposed in front of the image sensor 50, and thus internal reflection of light may occur in a space between the optical shutter 40 and the image sensor 50. Therefore, due to the internal reflection of light, an intensity of light sensed by each pixel of the image sensor 50 may be distorted, and accordingly, IR images and a depth image to be generated by the processor 10 may also be distorted. This phenomenon may finally result in unintended blur that is manifested on the depth image. The processor 10 according to the present exemplary embodiment may perform image processing for reducing blur of a depth image by correcting the aforementioned effect of internal reflection. This will be described in further detail below with reference to other drawings.

Figure 2:
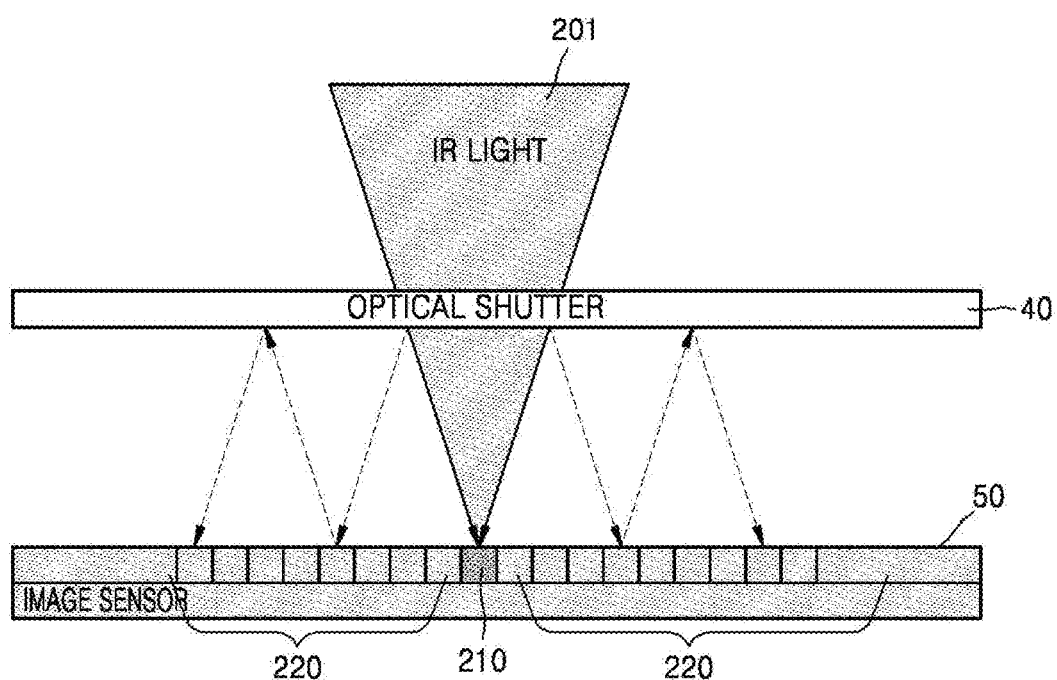
FIG. 2 is a diagram illustrating internal reflection of infrared (IR) light occurring in a space between an optical shutter and an image sensor of a ToF measuring apparatus, according to an exemplary embodiment.

FIG. 2 is a diagram illustrating internal reflection of IR light occurring in a space between an optical shutter and an image sensor of a ToF measuring apparatus, according to an exemplary embodiment.

Referring to a cross-sectional view shown in FIG. 2, IR light 201 reflected by the subject (2 of FIG. 1) is incident on the image sensor 50 via the optical shutter 40. At this time, a focus of the IR light 201 may be a focus pixel 210 which is a particular pixel of the pixel array in the image sensor 50. However, while most of the amount of the IR light 201 incident on the focus pixel 210 is sensed by the focus pixel 210, a portion of the IR light 201 may be reflected by a surface of the focus pixel 210.

The light reflected by the surface of the focus pixel 210 may be reflected again by an inner surface of the optical shutter 40, spread to nearby pixels 220 around the focus pixel 210, and reflected. Therefore, the nearby pixels 220 may also sense an amount of the IR light 201 focused onto the focus pixel 210, and unintended blur may occur in pixels of IR images and a depth image to be generated by the processor (10 of FIG. 1).

In this aspect, the farther the IR light 201 is from the focus pixel 210, the higher the number of times that the IR light 201 is reflected. Therefore, a spread characteristic of internal reflection of the IR light 201 may have a characteristic of an exponentially decaying point spread function. A degree of spread of such internal reflection of the IR light 201 occurring in the space between the optical shutter 40 and the image sensor 50 may vary based on a reflectivity of the optical shutter 40, a reflectivity of the image sensor 50, and/or a distance between the optical shutter 40 and the image sensor 50. Therefore, the point spread function may also vary based on the reflectivities of the optical shutter 40 and the image sensor 50 and/or the distance between the optical shutter 40 and the image sensor 50. In addition, since the optical shutter 40 and the image sensor 50 are arranged to be parallel to each other, pixels of the pixel array in the image sensor 50 may be considered to have the same point spread characteristic.

Image blur caused by the internal reflection of the IR light 201 may be corrected by using a sharpening filter which compensates for the spread characteristic of the point spread function.

Figure 3:
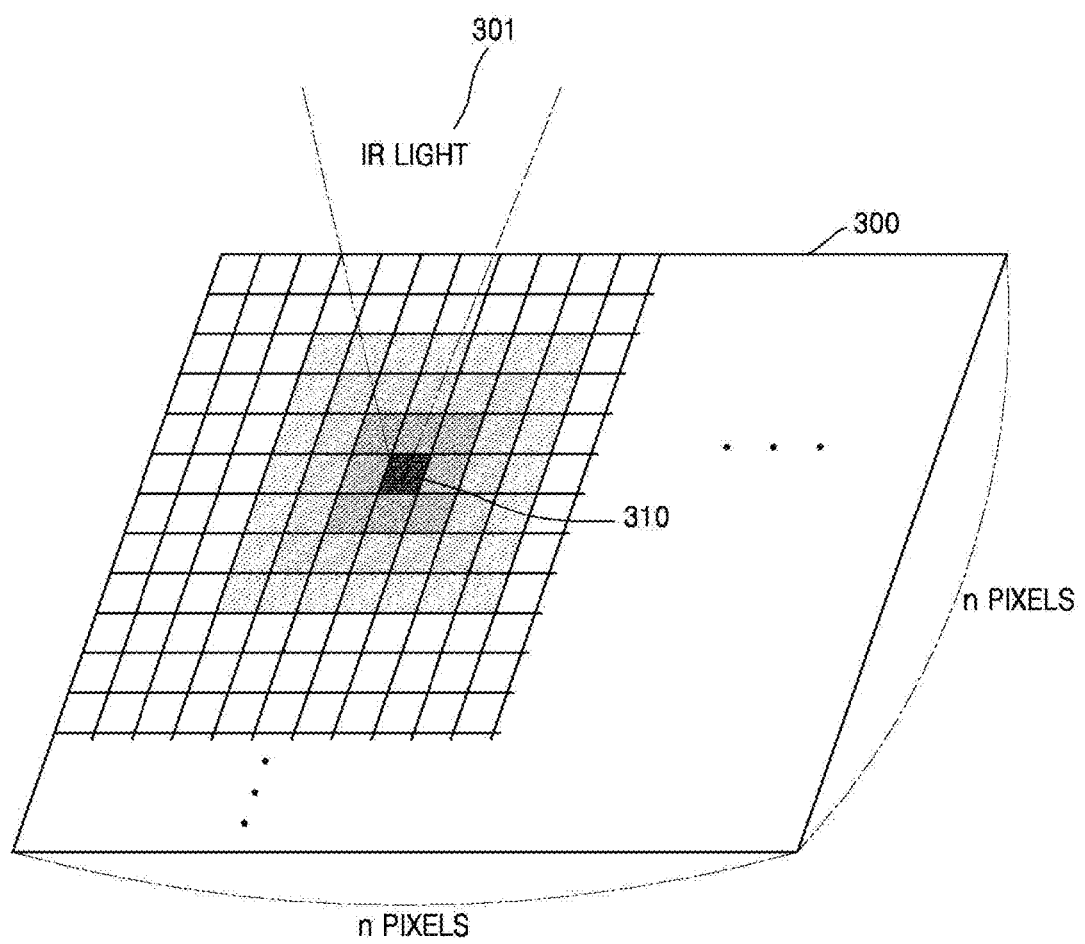
FIG. 3 is a diagram illustrating a distribution of light intensities resulting from internal reflection of IR light in a space between an optical shutter and an image sensor and sensed by a focus pixel and nearby pixels, according to an exemplary embodiment.

FIG. 3 is a diagram illustrating a distribution of light intensities resulting from internal reflection of IR light in a space between an optical shutter and an image sensor and sensed by a focus pixel and nearby pixels, according to an exemplary embodiment.

Referring to FIG. 3, a description will be provided based on an assumption that the image sensor 50 is implemented as a pixel array having sensing devices of n×n (where n is a natural number) pixels, but the present exemplary embodiment is not limited thereto.

IR light 301 reflected by the subject (2 of FIG. 1) may be focused onto a focus pixel 310 of a pixel array 300 in the image sensor 50 via the optical shutter 40. However, as described above with reference to FIG. 2, the IR light 301 may be reflected and spread to nearby pixels around the focus pixel 310. Since most of the amount of the IR light 301 is sensed by the focus pixel 310, the highest intensity of the IR light 301 will be sensed at the focus pixel 310.

With an increase in distance from the focus pixel 310, the number of times that the IR light 301 is reflected increases, and thus an intensity of the spread IR light 301 may exponentially decay. Therefore, when a distance from the focus pixel 310 to a nearby pixel increases, the nearby pixel may sense a lower intensity of the IR light 301.

Further, although a spread characteristic of the IR light 301 has been described based on the single pixel 310 in the pixel array 300 in FIG. 3, all of the pixels in the pixel array may be considered to show the same spread characteristic as the exemplifying focus pixel 310.

Figure 4:
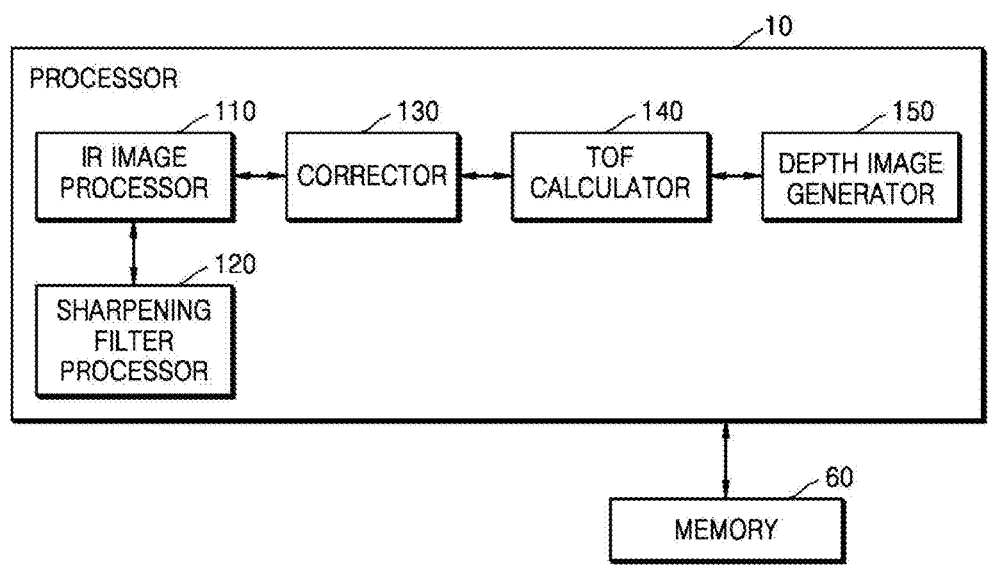
FIG. 4 is a block diagram showing a hardware configuration of a processor in a ToF measuring apparatus, according to an exemplary embodiment.

FIG. 4 is a block diagram showing a hardware configuration of a processor in a ToF measuring apparatus, according to an exemplary embodiment.

The processor 10 may include an IR image processor 110, a sharpening filter processor 120, a corrector 130, a ToF calculator 140, and a depth image generator 150. However, since only elements related to exemplary embodiments are shown in the processor 10 of FIG. 4, those of ordinary skill in the art will understand that general-purpose elements other than the elements shown in FIG. 4 may be further included in the processor 10.

The IR image processor 110 processes IR light signals sensed by the image sensor 50. The IR light signals sensed by the image sensor 50 correspond to IR light signals of a scene which is captured by the ToF measuring apparatus 1 in order to generate a depth image. As described above, since the light source 20 emits IR rays of different phases toward a subject, the IR image processor 110 may process IR light signals of different phases and generate IR images of different phases. For example, the IR image processor 110 may generate IR images having a phase of 0 degrees, a phase of 90 degrees, a phase of 180 degrees, and a phase of 270 degrees.

First, the IR image processor 110 acquires intensities of IR light sensed by respective pixels of the pixel array in the image sensor 50. The IR image processor 110 generates IR images of different phases by converting the acquired light intensities into pixel values of the respective pixels on the IR images.

The sharpening filter processor 120 may operate when the ToF measuring apparatus 1 captures a sample subject which is provided for a purpose of designing a sharpening filter. Here, the sample subject may be an object in the shape of a straight line that is vertically or horizontally parallel to the pixel array of the image sensor 50. In particular, when the image sensor 50 senses IR light reflected by the sample subject and incident via the optical shutter 40, the sharpening filter processor 120 models a spread characteristic of IR light reflected in the space between the optical shutter 40 and the image sensor 50 based on an intensity distribution of IR light sensed by pixels in the image sensor 50. Then, the sharpening filter processor 120 acquires a sharpening filter that is configured for correcting effects of the incident IR light reflected to nearby pixels by using the modeled spread characteristic. The term "sharpening filter" may be replaced by various other terms, such as "sharpening mask," "sharpening kernel," and so on. Meanwhile, the sharpening filter acquired by the sharpening filter processor 120 may be a Gaussian sharpening filter, but is not limited thereto.

As described above in FIG. 2, the sharpening filter processor 120 may model a spread characteristic by using a point spread function which indicates a degree to which IR light incident on a focus pixel of the image sensor 50 is reflected to nearby pixels in the internal space. The point spread function may be a function indicating a degree to which an intensity of the IR light incident on the focus pixel exponentially decays when the IR light is reflected to nearby pixels, or may vary based on the reflectivities of the optical shutter 40 and the image sensor 50 and/or the distance between the optical shutter 40 and the image sensor 50.

First, the sharpening filter processor 120 acquires intensities of IR light sensed by the focus pixel and nearby pixels disposed horizontally or vertically parallel to the focus pixel in the image sensor 50, converts the intensities of the focus pixel and the nearby pixels to a logarithmic scale, and acquires a point spread function based on the intensities that have been converted to the logarithmic scale, thereby modeling the spread characteristic.

Next, the sharpening filter processor 120 negates intensity values of the focus pixel and the nearby pixels defined by the point spread function, replaces the negated intensity value of the focus pixel with a replacement value for normalizing the negated intensity values, and acquires a sharpening filter based on the replacement value of the focus pixel and the negated intensity values of the nearby pixels.

The sharpening filter is intended to compensate the focus pixel for intensities of IR light reflected to nearby pixels, wherein the intensities are defined by the point spread function.

By using the ToF measuring apparatus 1, a user may capture a sample subject (e.g., a sample object) for designing a sharpening filter or capture other scenes including a variety of subjects (objects) for obtaining a desired depth image.

When a sample subject for designing a sharpening filter is captured, a sharpening filter is acquired (designed) via processing of the IR image processor 110 and the sharpening filter processor 120 of the processor 10, and the acquired sharpening filter is stored in the memory 60.

After the acquisition of the sharpening filter is finished, the user may capture a scene for which a depth image is desired to be generated by using the ToF measuring apparatus 1. In this case, the image sensor 50 of the ToF measuring apparatus 1 acquires IR images of different phases of the scene captured for generating a depth image. The corrector 130 of the processor 10 corrects (i.e., adjusts) pixel values of the IR images by using the previously acquired (stored) sharpening filter. At this time, the corrector 130 may perform correction (or an adjustment) by performing a convolution operation on the pixel values of the IR images using the sharpening filter.

The ToF calculator 140 acquires depth values of the scene by calculating ToFs of respective pixels based on the corrected (i.e., adjusted) pixel values.

The depth image generator 150 generates a depth image of the scene by using the acquired depth values. Since the correction (i.e., adjustment) has been performed above through sharpening filter processing of the corrector 130, an effect of light reflection in the internal space described in FIG. 2 is corrected (i.e., adjusted) in the depth image generated by the depth image generator 150 such that blur of the depth image may be reduced or removed.

Figure 5:
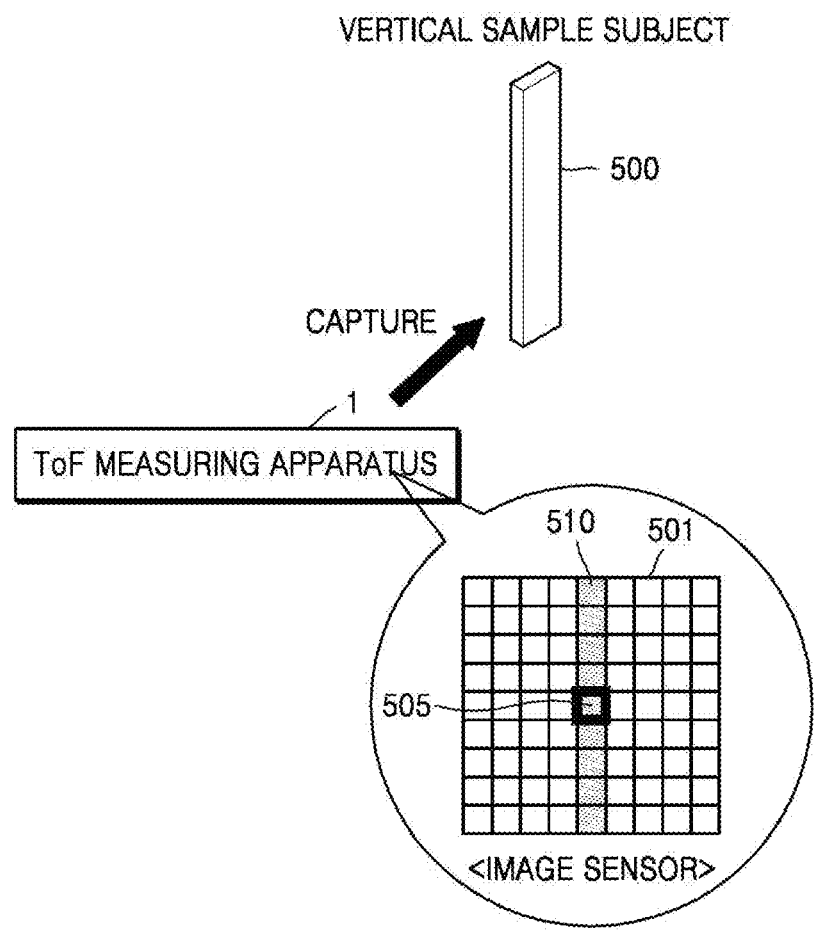
FIG. 5 is a diagram illustrating capturing of a vertical sample subject for designing a sharpening filter, according to an exemplary embodiment.

FIG. 5 is a diagram illustrating capturing of a vertical sample subject for designing a sharpening filter, according to an exemplary embodiment.

Referring to FIG. 5, the ToF measuring apparatus 1 may capture a vertical sample subject (a sample object) 500 in order to design a sharpening filter. The image sensor 50 in the ToF measuring apparatus 1 intensively senses light reflected by the vertical sample subject 500 at pixels 510 of a certain column in a pixel array 501. The reason that a vertical object is used as the sample subject 500 in this way may be that it is relatively easy to model a spread characteristic (i.e., a point spread function) at leftmost and rightmost nearby pixels of a certain focus pixel 505.

Figure 6:
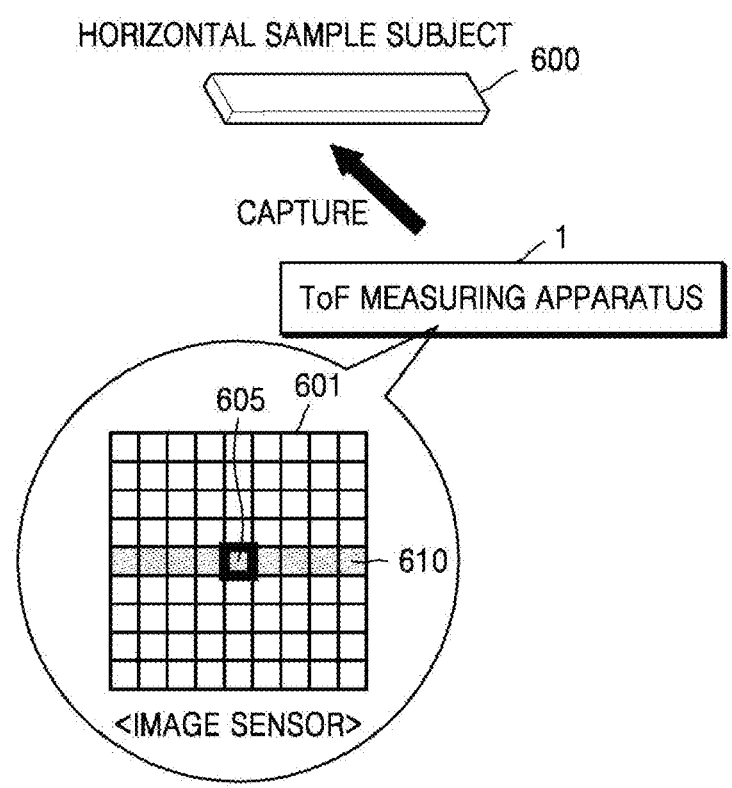
FIG. 6 is a diagram illustrating capturing of a horizontal sample subject for designing a sharpening filter, according to an exemplary embodiment.

FIG. 6 is a diagram illustrating capturing of a horizontal sample subject for designing a sharpening filter, according to an exemplary embodiment.

Referring to FIG. 6, the ToF measuring apparatus 1 may capture a horizontal sample subject (a sample object) 600 instead of the vertical sample subject 500 of FIG. 5 in order to design a sharpening filter. The image sensor 50 in the ToF measuring apparatus 1 intensively senses light reflected by the horizontal sample subject 600 at pixels 610 of a certain row in a pixel array 601. The reason that a horizontal object is used as the sample subject 600 unlike FIG. 5 may be that it is relatively easy to model a spread characteristic (i.e., a point spread function) at uppermost and lowermost nearby pixels of a certain focus pixel 605.

Figure 7:
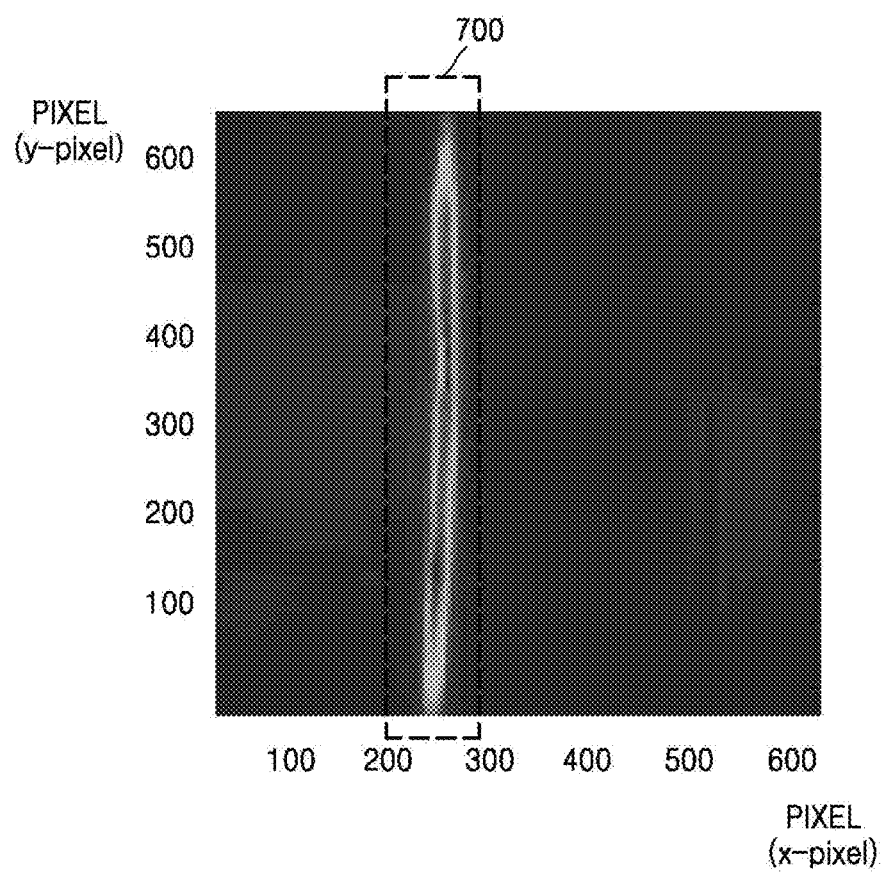
FIG. 7 is a diagram showing an intensity distribution of IR light on a vertical sample subject sensed by an image sensor, according to an exemplary embodiment.

FIG. 7 is a diagram showing an intensity distribution of IR light on a vertical sample subject sensed by an image sensor, according to an exemplary embodiment.

When the ToF measuring apparatus 1 captures an object, such as the vertical sample subject 500 of FIG. 5, for a purpose of designing a sharpening filter, an intensity distribution of IR light sensed by the pixel array of the image sensor 50 may be as shown in FIG. 7. A region 700 showing the highest intensity of IR light may be pixels of columns disposed between pixels of about a 200th column and pixels of about a 300th column on the x axis. Since the sample subject 500 is in a vertical shape, pixels on the y axis in the region 700 may sense similar intensities. Further, an intensity distribution of IR light sensed by the pixel array of the image sensor 50 shown in FIG. 7 may have been processed by the IR image processor 110 in the processor 10.

Figure 8:
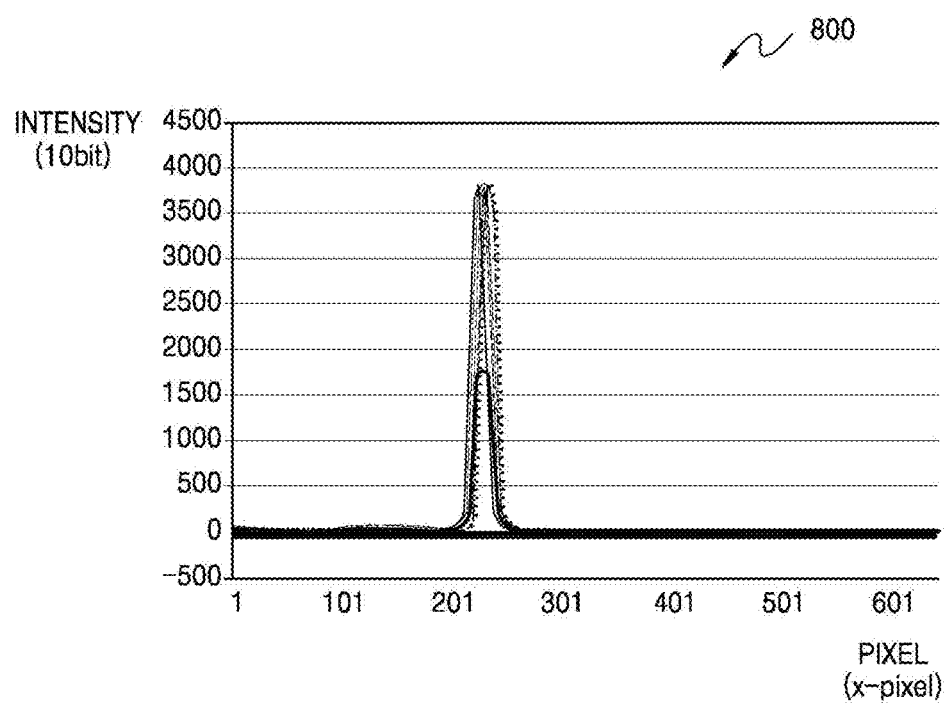
FIG. 8 is a graph showing an intensity distribution in pixels of FIG. 7, according to an exemplary embodiment.

FIG. 8 is a graph showing an intensity distribution in pixels of FIG. 7, according to an exemplary embodiment.

Referring to FIG. 8, a graph 800 shows intensity distributions in pixels disposed in the same rows (y-pixels). As described in FIG. 7, it is possible to see that the highest intensity of IR light is distributed between pixels of about a 200th column (x-pixels) and pixels of about a 250th column (x-pixels). This is because intensities of IR light reflected by a vertical sample subject are sensed. Nearby pixels outside the pixels of about the 200th column to the pixels of about the 250th column sense low intensities of IR light. The sharpening filter processor 120 acquires intensity distributions in the pixels disposed in the same rows (the y-pixels), such as the graph 800, based on the intensity distribution in the pixels shown in FIG. 7.

Figure 9:
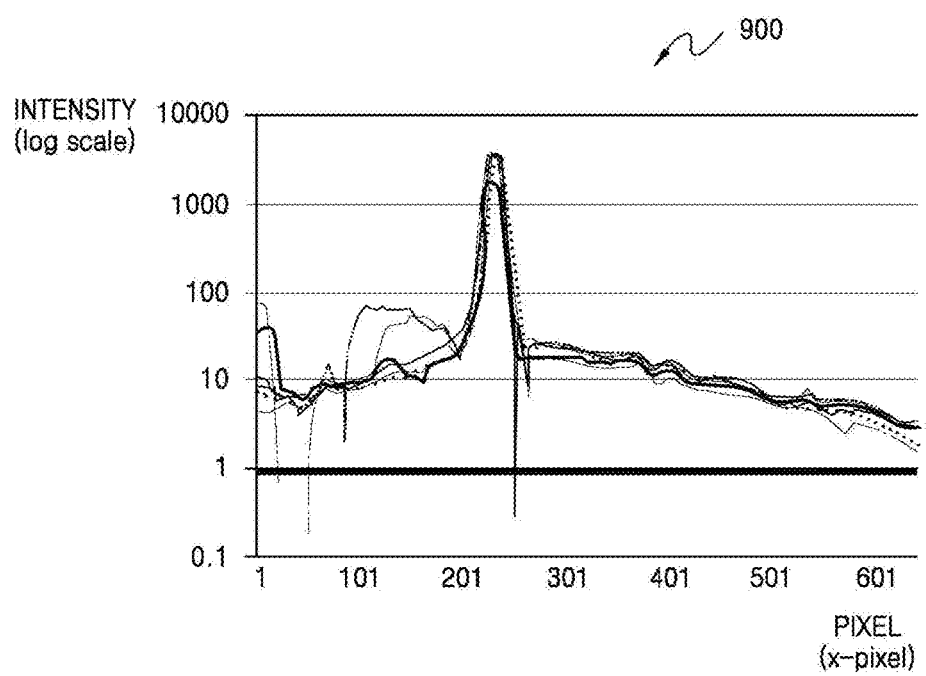
FIG. 9 is a diagram showing light intensities of the graph of FIG. 8 converted to a logarithmic scale, according to an exemplary embodiment.

FIG. 9 is a diagram showing light intensities of the graph of FIG. 8 converted to a logarithmic scale, according to an exemplary embodiment.

On the y axis of a graph 900 of FIG. 9, the intensities of the graph 800 of FIG. 8 have values that have been converted to a logarithmic scale. According to the graph 900, it is possible to see a spread characteristic in which intensities of IR light at nearby pixels exponentially decay by means of the logarithmic scale conversion. The sharpening filter processor 120 performs such intensity-to-logarithm scale conversion.

Figure 10:
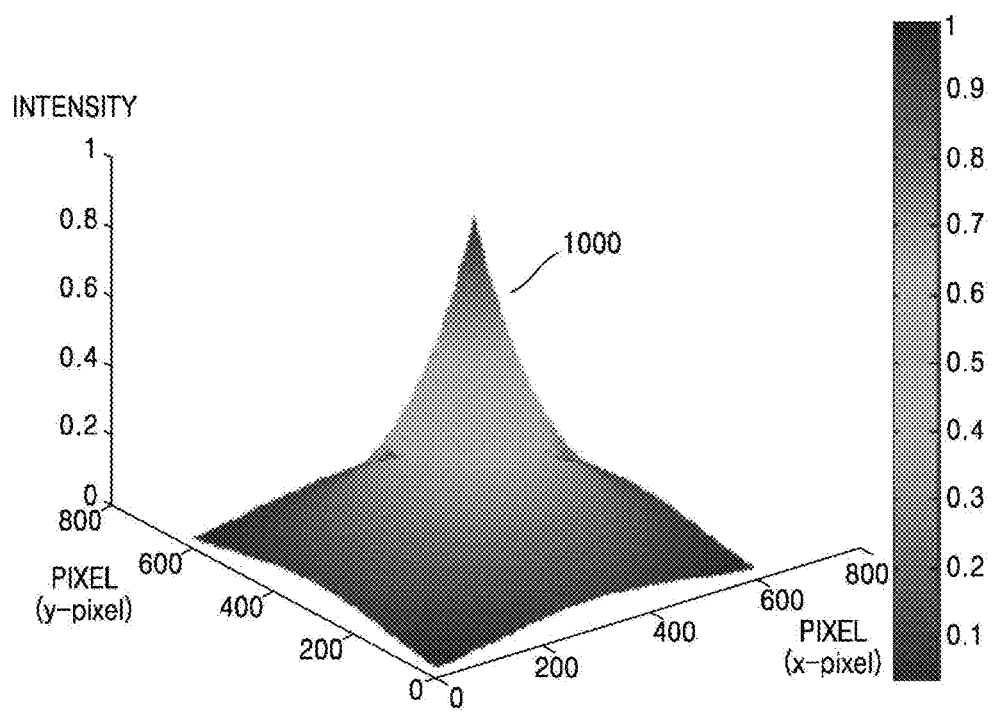
FIG. 10 is a diagram showing a result of three-dimensionally modeling a spread characteristic of internal reflection of IR light occurring in a space between an optical shutter and an image sensor, according to an exemplary embodiment.

FIG. 10 is a diagram showing a result of three-dimensionally modeling a spread characteristic of internal reflection of IR light occurring in a space between an optical shutter and an image sensor, according to an exemplary embodiment.

Referring to FIG. 10, the sharpening filter processor 120 models a spread characteristic by acquiring a point spread function based on intensities converted to a logarithmic scale. A three dimensional (3D) model 1000 representing the spread characteristic may show that a certain focus pixel has the highest light intensity and a light intensity exponentially decays according to the point spread function with an increase in distance from the focus pixel.

Figure 11:
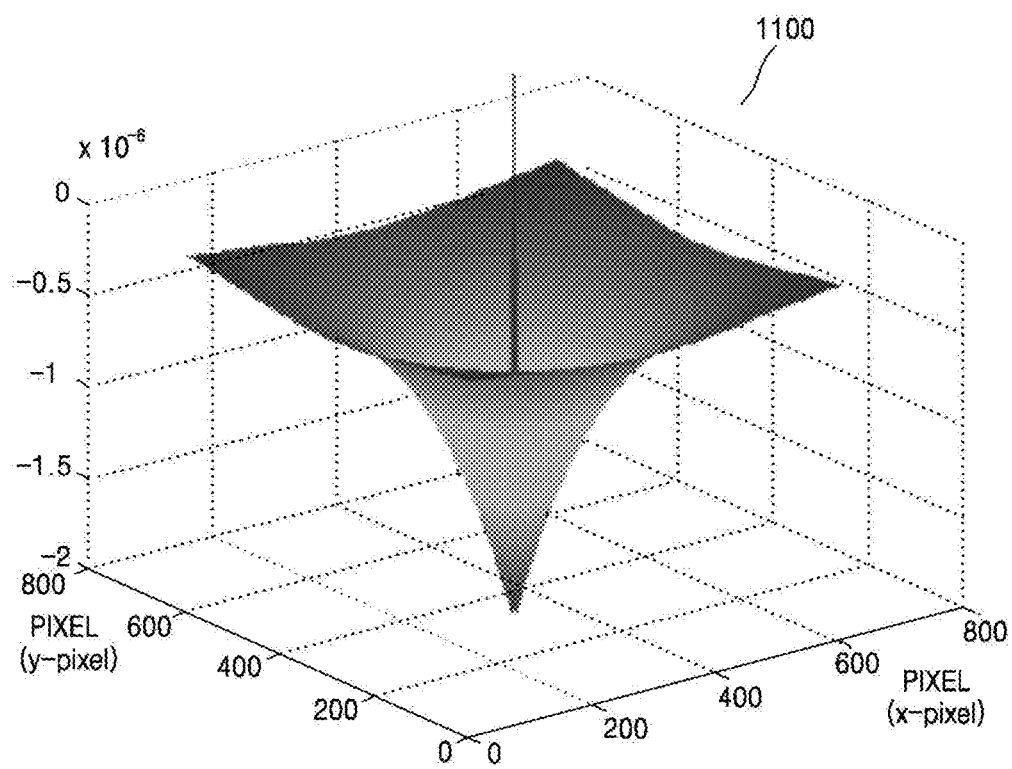
FIG. 11 is a diagram showing a three dimensional (3D) model corresponding to a sharpening filter, according to an exemplary embodiment.

FIG. 11 is a diagram showing a 3D model corresponding to a sharpening filter, according to an exemplary embodiment.

Referring to FIG. 11, as described above, the sharpening filter processor 120 negates intensity values of a focus pixel and nearby pixels defined by the point spread function (i.e., the 3D model 1000 of FIG. 10), replaces the negated intensity value of the focus pixel with a replacement value for normalizing the negated intensity values, and acquires a 3D model 1100 of a sharpening filter based on the replacement value of the focus pixel and the negated intensity values of the nearby pixels.

Figure 12:
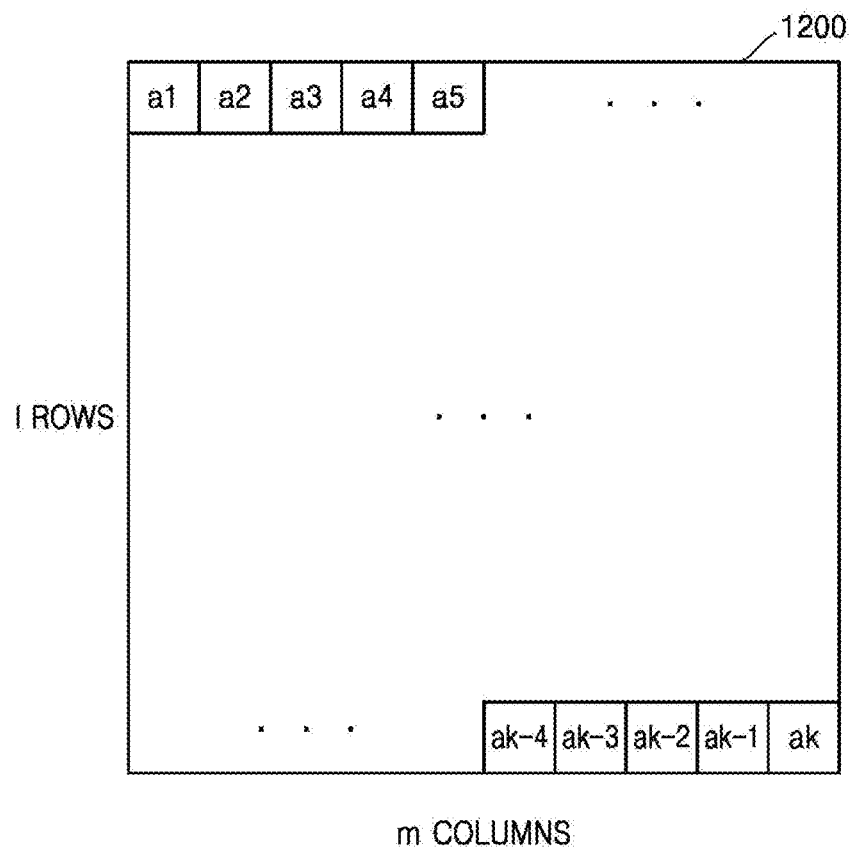
FIG. 12 is a diagram illustrating a sharpening filter expressed by matrix values of a matrix, according to an exemplary embodiment.

FIG. 12 is a diagram illustrating a sharpening filter expressed by matrix values of a matrix, according to an exemplary embodiment.

Referring to FIG. 12, a sharpening filter 1200 expressed by matrix values of an l×m (where l and m are natural numbers) matrix is based on the 3D model 1100 of FIG. 11. In particular, a z-axis value of a pixel (x, y) of the 3D model 1100 may correspond to a value of an $x^{th}$ row and a $y^{th}$ column of the sharpening filter 1200. The sharpening filter 1200 acquired by the sharpening filter processor 120 is stored in the memory 60 and applied to correction (i.e., adjustment) of IR images which will then be performed by the corrector 130.

Figure 13:
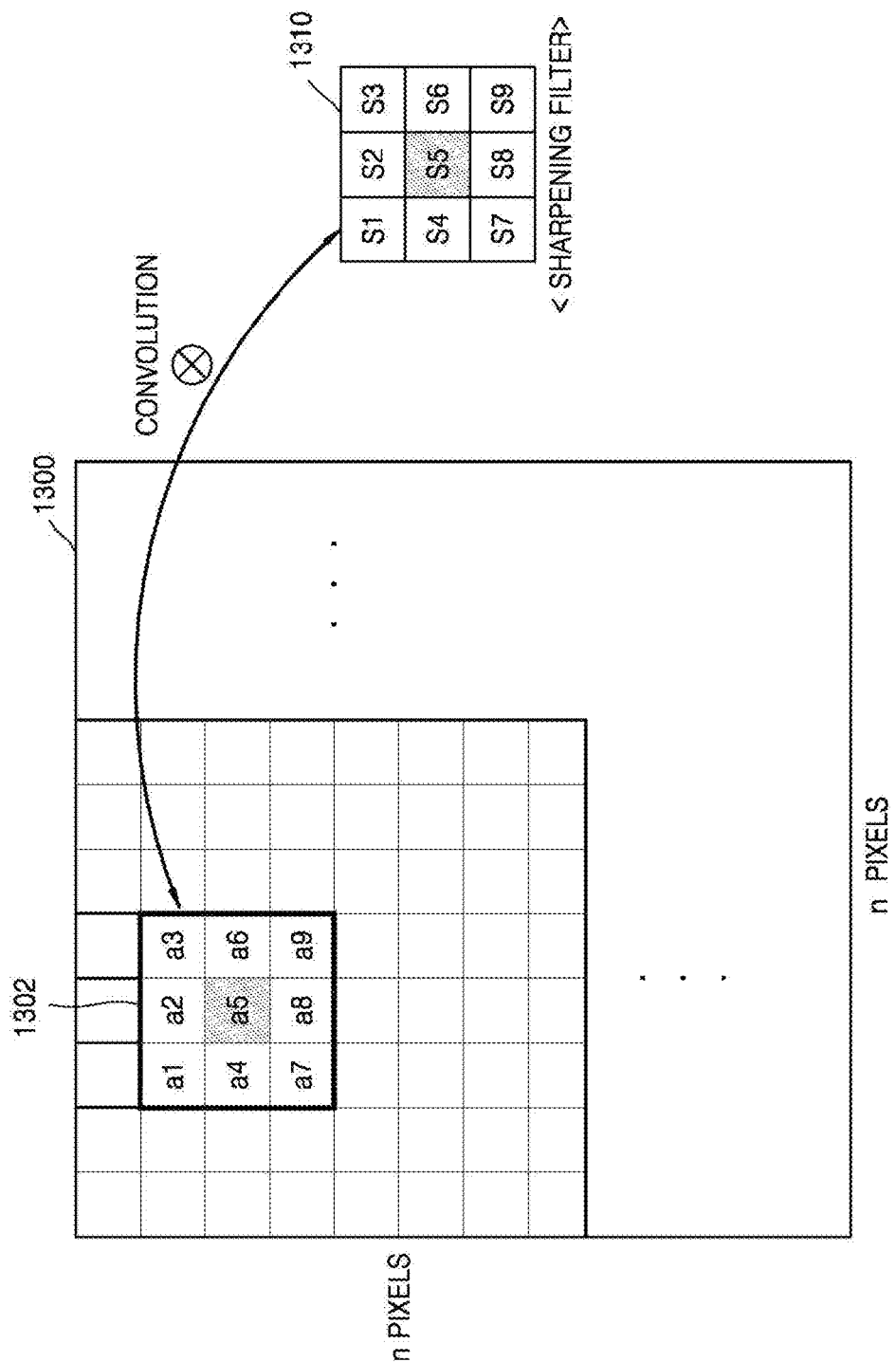
FIG. 13 is a diagram illustrating correction of pixel values of an IR image by using a sharpening filter, according to an exemplary embodiment.

FIG. 13 is a diagram illustrating correction of pixel values of an IR image by using a sharpening filter, according to an exemplary embodiment.

Referring to FIG. 13, a value of each pixel of an IR image 1300 corresponds to an intensity of reflected light sensed by each pixel of the image sensor 50. The corrector 130 corrects (i.e., adjusts) pixel values of the IR image 1300 by performing a convolution operation on the pixel values of the IR image 1300 by using a sharpening filter 1310. Although it is assumed in FIG. 13 that the sharpening filter 1310 is implemented as a 3×3 matrix for convenience of description, a sharpening filter according to the present exemplary embodiment is not limited thereto, and may be implemented as matrices of various sizes. A size of the sharpening filter 1310 may vary according to various factors, such as performance of the processor 10, resolution of an IR image, and so on.

The sharpening filter 1310 of a 3×3 matrix may correct pixel values of a 3×3 pixel array 1302 in the IR image 1300. In this aspect, it is possible to correct the pixel values of the 3×3 pixel array 1302 by performing a convolution of 3×3 matrix values of the sharpening filter 1310 and the pixel values of the 3×3 pixel array 1302. In particular, the size of the sharpening filter 1310 may correspond to a size of the pixel array 1302 in the IR image 1300 on which convolution will be performed, but is not limited thereto.

The corrector 130 corrects (i.e., adjusts) the pixel values of the IR image 1300 by performing a convolution of all pixels in the IR image 1300 using the sharpening filter 1310.

Figure 14:
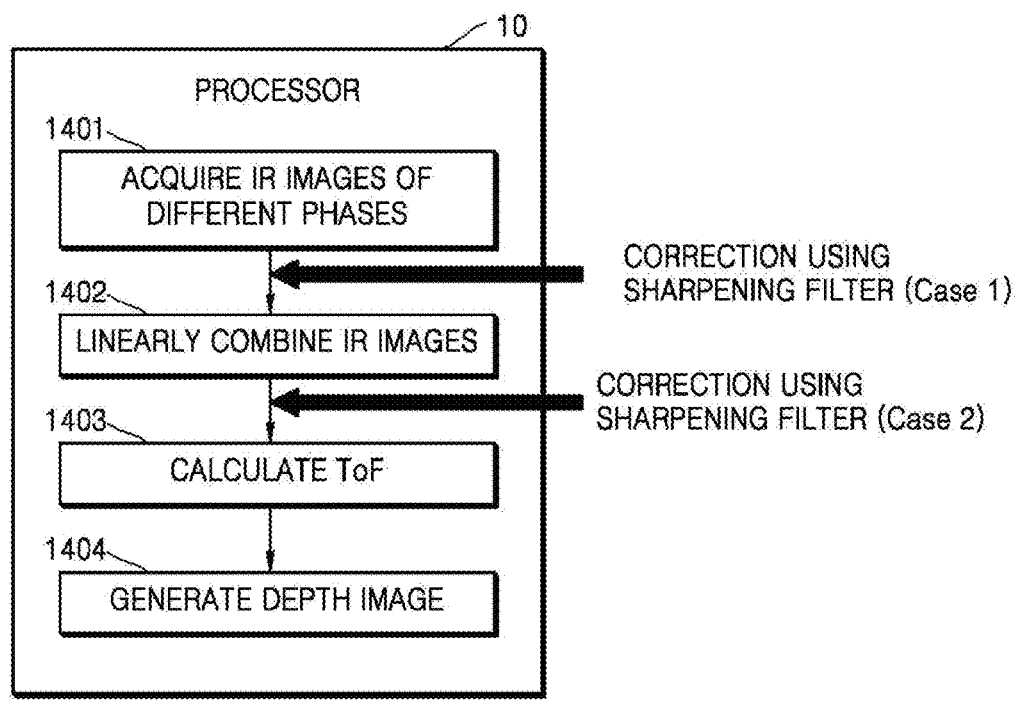
FIG. 14 is a diagram illustrating operations in which correction using a sharpening filter may be applied in a process of generating a depth image, according to an exemplary embodiment.

FIG. 14 is a diagram illustrating operations in which correction using a sharpening filter may be applied in a depth image generation process, according to an exemplary embodiment. Those of ordinary skill in the art will understand that the depth image generation process shown in FIG. 14 shows only some operations related to the present exemplary embodiment.

In operation 1401, the image sensor 50 and the IR image processor 110 of the processor 10 acquire IR images of different phases of a scene for which a depth image is to be generated.

In operation 1402, the IR image processor 110 of the processor 10 performs a linear combination operation on the IR images of different phases.

In operation 1403, the ToF calculator 140 of the processor 10 calculates ToFs based on the calculation results of the IR images, and calculates depth values of respective pixels of a depth image based on the calculated ToFs.

In operation 1404, the depth image generator 150 of the processor 10 generates a depth image based on the calculated depth values.

Correction of the corrector 130 by using a sharpening filter may be performed between operation 1401 and operation 1402 (case 1) or between operation 1402 and operation 1403 (case 2).

In detail, according to case 1, the corrector 130 may correct (i.e., adjust) each of the IR images of different phases by using a sharpening filter. Subsequently, the IR image processor 110 performs a linear combination operation on the corrected (i.e., adjusted) IR images.

According to case 2, unlike case 1, the corrector 130 does not correct or adjust each of the IR images by using a sharpening filter, but may perform a linear combination operation on the IR images first and then correct (i.e., adjust) a result of the linear combination operation by using a sharpening filter.

Figure 15:
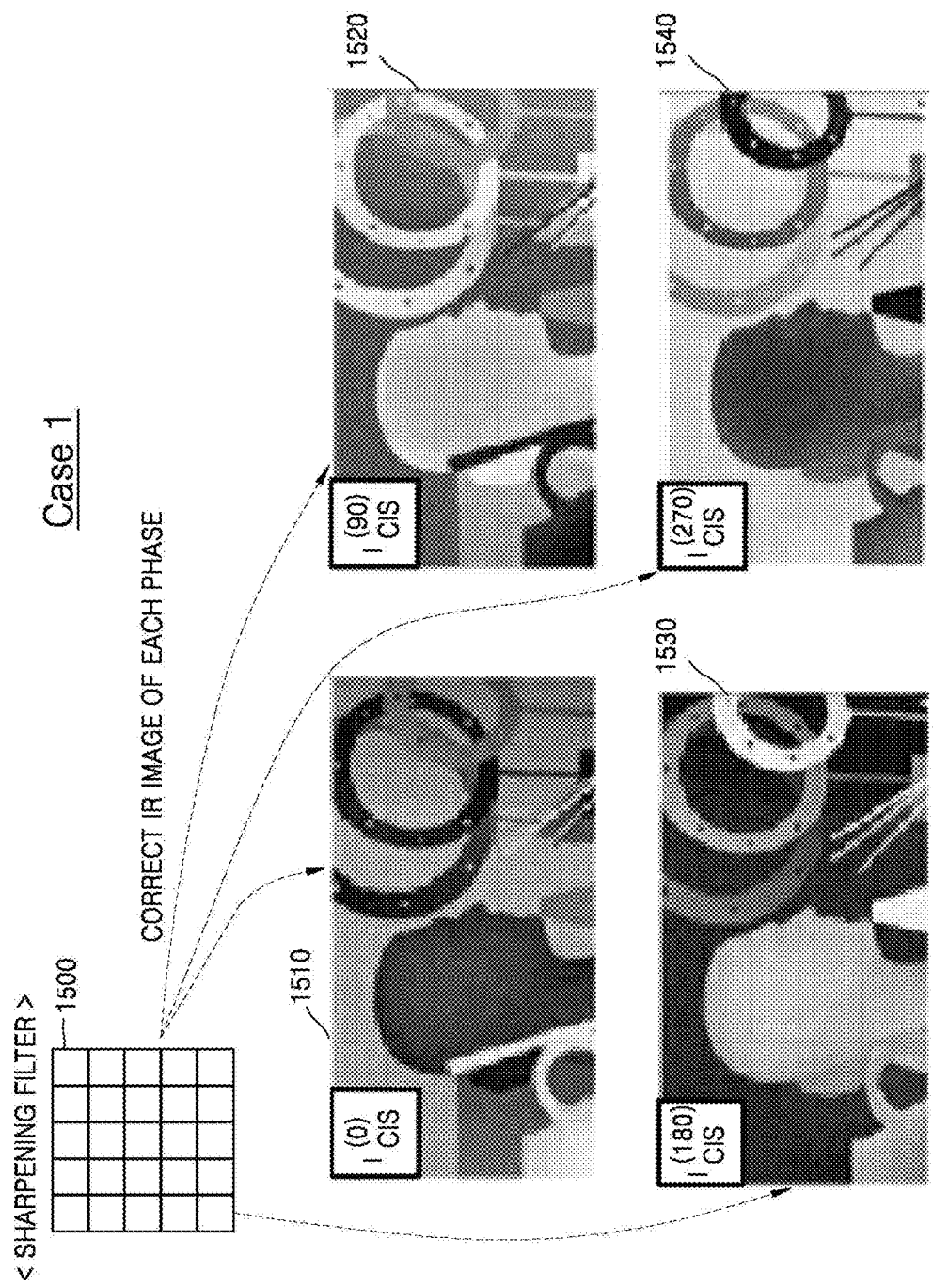
FIG. 15 is a diagram illustrating a case of correcting each of IR images of different phases with a sharpening filter (case 1), according to an exemplary embodiment.

FIG. 15 is a diagram illustrating a case (case 1) of correcting each of IR images of different phases with a sharpening filter, according to an exemplary embodiment.

Referring to FIG. 15, the IR images of different phases may include an IR image 1510 of a phase of 0 degrees, an IR image 1520 of a phase of 90 degrees, an IR image 1530 of a phase of 180 degrees, and an IR image 1540 of a phase of 270 degrees. According to case 1, the corrector 130 corrects (i.e., adjusts) each of the IR image 1510, the IR image 1520, the IR image 1530, and the IR image 1540 by using a sharpening filter 1500.

FIG. 16 is a diagram illustrating a case of correcting a result of a linear combination operation of IR images with a sharpening filter (case 2), according to an exemplary embodiment.

Referring to FIG. 16, first, a linear combination operation and a non-linear operation, such as $\tan^{-1}$, are performed on IR images of different phases in order to calculate ToFs. Before the non-linear operation is performed, the correction (i.e., adjustment) of the corrector 130 according to case 2 is applied to a result of the linear combination operation. In detail, the IR image processor 110 may acquire a first image 1610 which is a result of a linear combination operation by performing the linear combination operation on an IR image 1601 of a phase of 0 degrees and an IR image 1602 of a phase of 180 degrees. Also, the IR image processor 110 may acquire a second image 1620 which is a result of a linear combination operation by performing the linear combination operation on an IR image 1603 of a phase of 270 degrees and an IR image 1604 of a phase of 90 degrees. According to case 2, the corrector 130 corrects (i.e., adjusts) the first image 1610 by using the sharpening filter 1600 and corrects (i.e., adjusts) the second image 1620 by using the sharpening filter 1600. Then, the non-linear operation, such as $\tan^{-1}$, may be performed on the corrected first image 1610 and the corrected second image 1620.

FIG. 17 is a flowchart of an image processing method for reducing blur of a depth image, according to an exemplary embodiment. Referring to FIG. 17, the image processing method includes operations processed over time by the above-described ToF measuring apparatus 1. Therefore, descriptions of the above drawings may be applied to the image processing method of FIG. 17 even though such descriptions are omitted below.

In operation 1710, the image sensor 50 senses IR light which is reflected by a sample subject provided for designing a sharpening filter and incident thereon via the optical shutter 40.

In operation 1720, the processor 10 models a spread characteristic of IR light reflected in a space between the optical shutter 40 and the image sensor 50 based on an intensity distribution of the IR light sensed by pixels in the image sensor 50.

In operation 1730, the processor 10 acquires a sharpening filter which is configured for correcting effects of the incident IR light reflected toward nearby pixels by using the modeled spread characteristic.

Meanwhile, the exemplary embodiments described above may be written as a program executable by a computer and implemented in a general-purpose digital computer that runs the program by using a transitory or non-transitory computer-readable recording medium. Also, data structures used in the exemplary embodiments described above may be recorded in a transitory or non-transitory computer-readable recording medium in several ways. The non-transitory computer-readable recording medium includes storage media such as magnetic storage media (e.g., a ROM, a floppy disk, a hard disk, etc.) and optical storage media (e.g., a CD-ROM, a DVD, etc.).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image processing method for reducing blur of a depth image, the method comprising:
sensing, by an image sensor, infrared (IR) light reflected by a sample subject and incident via an optical shutter;
acquiring a point spread function that indicates a degree to which an intensity of the IR light incident on a focus pixel of the image sensor is reflected toward nearby pixels in a space, based on a distance between the optical shutter and the image sensor;
modeling a spread characteristic of the IR light reflected in the space between the optical shutter and the image sensor based on the point spread function; and
acquiring a sharpening filter which is configured for correcting effects of the incident IR light reflected toward the nearby pixels by using the modeled spread characteristic.

2. The image processing method of claim 1,
wherein the acquiring the point spread function comprises acquiring the point spread function further based on a reflectivity of the optical shutter and a reflectivity of the image sensor.

3. The image processing method of claim 1,
wherein the point spread function indicates a degree to which the intensity of the IR light incident on the focus pixel exponentially decays when the IR light is reflected toward the nearby pixels.

4. The image processing method of claim 1,
wherein the modeling of the spread characteristic comprises:
acquiring respective intensities of the IR light sensed by a focus pixel and the nearby pixels disposed horizontally or vertically with respect to the focus pixel in the image sensor;
converting the acquired intensities of the pixels to a logarithmic scale; and
modeling the spread characteristic by determining a point spread function based on the converted intensities.

5. The image processing method of claim 4,
wherein the sharpening filter is configured to compensate the focus pixel for respective intensities of the IR light reflected toward the nearby pixels, the respective intensities being defined by the point spread function.

6. The image processing method of claim 5,
wherein the acquiring of the sharpening filter comprises:
negating respective intensity values of the focus pixel and the nearby pixels defined by the point spread function;
replacing the negated intensity value of the focus pixel with a replacement value for normalizing the negated intensity values; and
acquiring the sharpening filter based on the replacement value of the focus pixel and the negated intensity values of the nearby pixels.

7. The image processing method of claim 1, further comprising:
acquiring IR images of different phases of a scene captured for generating a depth image after the sharpening filter is acquired;
adjusting pixel values of the acquired IR images by using the acquired sharpening filter;
acquiring depth values of the scene by calculating a time of flight (ToF) of each pixel based on the adjusted pixel values; and
generating the depth image of the scene by using the acquired depth values.

8. The image processing method of claim 7, wherein the adjusting of the pixel values comprises using the sharpening filter to perform a convolution operation on the pixel values of the IR images.

9. The image processing method of claim 7,
wherein the adjusting of the pixel values comprises adjusting each of the IR images of different phases by using the sharpening filter, and
the acquiring of the depth values comprises:
performing a linear combination operation on the IR images having the adjusted pixel values; and
acquiring the depth values based on a result of the performed linear combination operation.

10. The image processing method of claim 7,
wherein the adjusting of the pixel values comprises:
performing a linear combination operation on the IR images; and
adjusting a result of the performed linear combination operation by using the sharpening filter.

11. A non-transitory computer-readable recording medium storing a program for causing a computer to execute the method of claim 1.

12. A time of flight (ToF) measuring apparatus comprising:
an optical shutter;
an image sensor configured to sense infrared (IR) light reflected by a sample subject and incident via the optical shutter; and
a processor configured to acquire a point spread function that indicates a degree to which an intensity of the IR light incident on a focus pixel of the image sensor is reflected toward nearby pixels in a space, based on a distance between the optical shutter and the image sensor, to model a spread characteristic of the IR light reflected in the space between the optical shutter and the image sensor based on an intensity distribution of the IR light sensed by pixels in the image sensor, and to acquire a sharpening filter which is configured for correcting effects of the incident IR light reflected toward the nearby pixels by using the modeled spread characteristic.

13. The ToF measuring apparatus of claim 12, wherein the processor is configured to acquire the point spread function further based on a reflectivity of the optical shutter and a reflectivity of the image sensor.

14. The ToF measuring apparatus of claim 12,
wherein the processor is further configured to acquire respective intensities of the IR light sensed by a focus pixel and the nearby pixels disposed horizontally or vertically with respect to the focus pixel in the image sensor, to convert the acquired intensities of the pixels to a logarithmic scale, and to model the spread characteristic by determining a point spread function based on the converted intensities.

15. The ToF measuring apparatus of claim 14,
wherein the processor is further configured to negate respective intensity values of the focus pixel and the nearby pixels defined by the point spread function, to replace the negated intensity value of the focus pixel with a replacement value for normalizing the negated intensity values, and to acquire the sharpening filter based on the replacement value of the focus pixel and the negated intensity values of the nearby pixels.

16. The ToF measuring apparatus of claim 12,
wherein the image sensor is further configured to acquire IR images of different phases of a scene captured for generating a depth image after the sharpening filter is acquired, and
the processor is further configured to adjust pixel values of the acquired IR images by using the acquired sharpening filter, to acquire depth values of the scene by calculating a time of flight (ToF) of each pixel based on the adjusted pixel values, and to generate the depth image of the scene by using the acquired depth values.

17. The ToF measuring apparatus of claim 16,
wherein the processor is further configured to adjust each of the IR images of different phases by using the sharpening filter, to perform a linear combination operation on the IR images having the adjusted pixel values, and to acquire the depth values based on a result of the performed linear combination operation.

18. The ToF measuring apparatus of claim 16,
wherein the processor is further configured to perform a linear combination operation on the IR images, and to adjust a result of the performed linear combination operation by using the sharpening filter.

* * * * *